US008698460B2

(12) United States Patent
Ikeda

(10) Patent No.: US 8,698,460 B2
(45) Date of Patent: Apr. 15, 2014

(54) CHARGER THAT CHARGES RECHARGEABLE BATTERY ARRANGED IN ELECTRONIC DEVICE AND CHARGING METHOD FOR RECHARGEABLE BATTERY ARRANGED IN ELECTRONIC DEVICE

(75) Inventor: Takahiro Ikeda, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/601,760

(22) Filed: Aug. 31, 2012

(65) Prior Publication Data

US 2012/0326656 A1    Dec. 27, 2012

Related U.S. Application Data

(63) Continuation of application No. 12/654,355, filed on Dec. 17, 2009, now abandoned.

(30) Foreign Application Priority Data

Dec. 25, 2008    (JP) ................................ 2008-331509

(51) Int. Cl.
  *H01M 10/44* (2006.01)
  *H01M 10/46* (2006.01)

(52) U.S. Cl.
  USPC ........................................................ 320/160

(58) Field of Classification Search
  USPC .......... 320/103, 114, 115, 162, 160; 324/426, 324/427, 433
  See application file for complete search history.

(56) References Cited

U.S. PATENT DOCUMENTS

| 6,948,000 | B2 | 9/2005 | Desai et al. |
| 7,072,360 | B2 | 7/2006 | Dravida et al. |
| 7,231,540 | B2 | 6/2007 | Morimoto et al. |
| 7,999,511 | B2 * | 8/2011 | Umetsu ........................ 320/128 |
| 2002/0038432 | A1 | 3/2002 | Hsu |
| 2002/0124111 | A1 | 9/2002 | Desai et al. |
| 2005/0144495 | A1 | 6/2005 | Nakajima et al. |

(Continued)

FOREIGN PATENT DOCUMENTS

| CN | 101282045 A | 10/2008 |
| EP | 1 821 384 A2 | 8/2007 |

(Continued)

OTHER PUBLICATIONS

Japanese Office Action mailed Dec. 7, 2010 issued in Japanese Patent Application No. 2008-331509 (with translation).

(Continued)

*Primary Examiner* — Edward Tso
(74) *Attorney, Agent, or Firm* — Oliff PLC.

(57) ABSTRACT

A charger for an electronic device that charges a rechargeable battery of the electronic device. The charger includes a detection unit, which detects connection of another electronic device to the electronic device through a communication cable including a power supply line. A charging unit charges the rechargeable battery with power supply voltage from the power supply line. A measurement unit acquires a measurement value indicating a degree of a voltage drop of the power supply voltage occurred when the charging unit performs charging. A control unit instructs a charging current value for charging the rechargeable battery with the charging unit. When the detection unit detects connection of the other electronic device, the control unit monitors the measurement value while instructing the charging unit to increase the charging current value from an initial current value and determines the charging current value based on the monitored measurement value.

17 Claims, 7 Drawing Sheets

(56) References Cited

U.S. PATENT DOCUMENTS

| | | |
|---|---|---|
| 2007/0120531 A1 | 5/2007 | Huh |
| 2008/0238370 A1 | 10/2008 | Carrier et al. |
| 2008/0258688 A1 | 10/2008 | Hussain et al. |
| 2008/0290834 A1* | 11/2008 | Umetsu .................. 320/107 |
| 2009/0009187 A1 | 1/2009 | Kwak |
| 2009/0085528 A1 | 4/2009 | Yamada |
| 2011/0050163 A1 | 3/2011 | Xiao et al. |

FOREIGN PATENT DOCUMENTS

| | | |
|---|---|---|
| JP | A-9-9624 | 1/1997 |
| JP | A-11-234922 | 8/1999 |
| JP | A-2004-86647 | 3/2004 |
| JP | A-2006-243863 | 9/2006 |
| JP | A-2007-60778 | 3/2007 |
| JP | A-2008-211950 | 9/2008 |
| WO | WO 2007/123050 A1 | 11/2007 |

OTHER PUBLICATIONS

Japanese Office Action mailed Sep. 20, 2011 issued in Japanese Patent Application No. 2008-331509 (with translation).
Apr. 17, 2013 Office Action issued in Chinese Application No. 200910252596.3 (with English Translation).

* cited by examiner

CHARGER THAT CHARGES RECHARGEABLE BATTERY ARRANGED IN ELECTRONIC DEVICE AND CHARGING METHOD FOR RECHARGEABLE BATTERY ARRANGED IN ELECTRONIC DEVICE

CROSS-REFERENCE TO RELATED APPLICATIONS

This application is a continuation of U.S. patent application Ser. No. 12/654,355, filed on Dec. 17, 2009, which is based upon and claims the benefit of priority from prior Japanese Patent Application No. 2008-331509, filed on Dec. 25, 2008, the entire contents of which are incorporated herein by reference.

BACKGROUND OF THE INVENTION

The present invention relates to a charger for an electronic device that charges a rechargeable battery of the electronic device, an electronic device, and a charging method.

Nowadays, there are more electronic devices, such as an electronic still camera, a mobile phone, a personal digital assistant (PDA), and a portable game machine, that charge its rechargeable battery with bus power, which is supplied from another electronic device (e.g., personal computer), which serves as a connection origin, through, for example, a USB or IEEE 1394 communication cable.

Japanese Laid-Open Patent Publication No. 2006-243863 describes technology for sending input current of bus power, which is obtained from a USB bus, to a power supply line of an HDD block. A charging circuit uses some of the input current to charge a rechargeable battery. A step-up circuit increases the output voltage of the rechargeable battery, and the output current of the rechargeable battery is added to the current of the power supply line and supplied to the HDD block. This ensures that the HDD block is supplied with sufficient drive power while the value of the current flowing to the USB remain in accordance with the standardized specification.

The USB standard allows for two different currents to be supplied, 100 mA and 500 mA.

For 100 mA, a problem occurs in that when there is not enough power, a CPU of a charger in an electronic camera cannot be activated. In such a case, communication cannot be performed with an electronic device that is connected to the charger and serves as the connection origin. Thus, information (specified voltage, specified current, etc.) necessary for the charging cannot be acquired from the connected electronic device.

An AC adapter incorporating a USB connector may be used to charge a USB-applicable electronic device. In this case, the AC adapter serves as the connection origin. Thus, the electronic device cannot perform USB communication and therefore cannot determine the specified current of the AC adapter.

In this manner, a rechargeable battery cannot be stably charged when charging information, such as the specified current of another electronic device serving as the connection origin cannot be acquired. This problem does not occur only in electronic cameras and also occurs in many types of electronic devices that charge its rechargeable battery with bus power.

SUMMARY OF THE INVENTION

Accordingly, it is an object of the present invention to provide a charger for an electronic device, an electronic device, and a charging method that stably charge a rechargeable battery even when charging information cannot be acquired from another electronic device, which serves as a connection origin.

One aspect of the present invention is a charger for an electronic device that charges a rechargeable battery arranged in the electronic device. The charger includes a detection unit which detects connection of another electronic device to the electronic device through a communication cable including a power supply line. A charging unit charges the rechargeable battery with power supply voltage from the power supply line of the communication cable. A measurement unit acquires a measurement value indicating a degree of a voltage drop of the power supply voltage occurred when the charging unit performs charging. A control unit instructs a charging current value for charging the rechargeable battery with the charging unit. When the detection unit detects connection of the other electronic device, the control unit monitors the measurement value obtained by the measurement unit while instructing the charging unit to increase the charging current value from an initial current value and determines the charging current value based on the monitored measurement value.

A further aspect of the present invention is an electronic device capable of using a rechargeable battery. The electronic device includes a charger which charges the rechargeable battery that is arranged in the electronic device. The charger includes a detection unit which detects connection of another electronic device to the electronic device through a communication cable including a power supply line. A charging unit charges the rechargeable battery with power supply voltage from the power supply line of the communication cable. A measurement unit acquires a measurement value indicating a degree of a voltage drop of the power supply voltage occurred when the charging unit performs charging. A control unit instructs a charging current value for charging the rechargeable battery with the charging unit. When the detection unit detects connection of the other electronic device, the control unit monitors the measurement value obtained by the measurement unit while instructing the charging unit to increase the charging current value from an initial current value and determines the charging current value based on the monitored measurement value.

Another aspect of the present invention is a method for charging a rechargeable battery arranged in an electronic device. The method includes detecting, by the electronic device, connection of another electronic device to the electronic device through a communication cable including a power supply line; starting, by the electronic device, charging of the rechargeable battery using a power supply voltage from the power supply line of the communication cable; acquiring, by the electronic device, a measurement value indicating a degree of a voltage drop of the power supply voltage occurred during charging; and determining, by the electronic device, a charging current value of the rechargeable battery based on the measurement value. The determining includes monitoring the measurement value during the charging while increasing the charging current value from an initial current value, and updating the charging current value based on the monitored measurement value.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

[First Embodiment]

An electronic device according to a first embodiment of the present invention will now be discussed with reference to FIGS. 1 to 5. Here, the electronic device is an electronic still camera 11.

Figure 1:
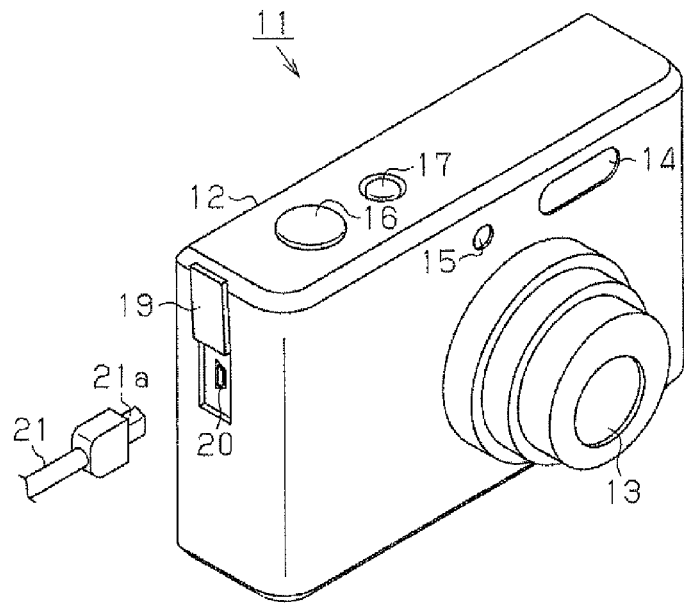
FIG. 1 is a perspective view showing an electronic still camera according to a first embodiment of the present invention.

As shown in FIG. 1, the electronic still camera 11 (digital still camera) of the present embodiment includes a camera body 12 having the shape of a rectangular cuboid. An image capturing lens unit 13 is arranged in the front central part of the camera body 12. A flash 14 (strobe light emitting unit) and an emission window 15 are arranged on the camera body 12 at two locations above the image capturing lens unit 13. The emission window 15 emits infrared light, ultrasonic waves, or the like towards a subject to perform focusing.

A release button 16, which a photographer pushes (i.e., activates) when initiating an image capturing operation with the electronic still camera 11, is arranged at the left end on the upper surface of the camera body 12 as viewed in FIG. 1. A power switch 17, which the photographer pushes to switch on the power of the electronic still camera 11, is arranged at the right side of the release button 16. A monitor such as a liquid crystal display (hereinafter referred to as "LCD 18") is arranged in the rear surface of the camera body 12 (see FIG. 3).

A Universal Serial Bus (USB) connector 20 (female connector) is arranged in an inner wall surface, which is exposed when a opening a resin terminal cover 19 on one side (left side as viewed in FIG. 1) of the camera body 12. A USB connector 21a (male connector) of a USB cable 21, which serves as a communication cable, is connectable to (insertable into) the USB connector 20.

Figure 2:
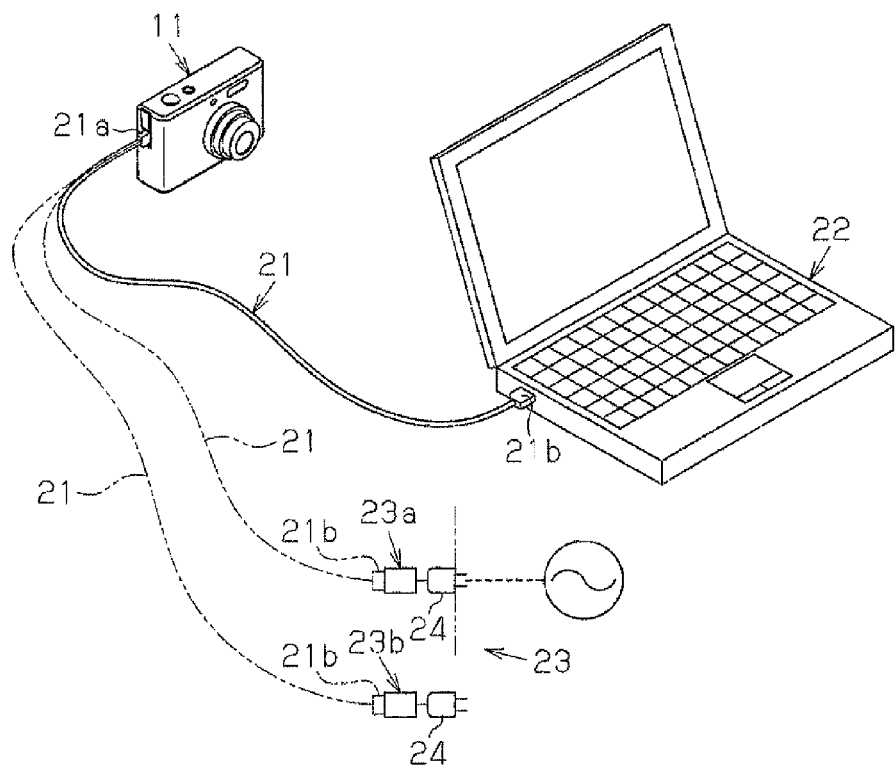
FIG. 2 is a perspective view showing a charging system in which the electronic still camera of FIG. 1 is connected to another electronic device.

As shown in FIG. 2, the electronic still camera 11 may be USB-connected by the USB cable 21 to another electronic device, which serves as a connection origin. The USB cable 21 has one USB connector 21a, which is connected to the USB connector 20, and another USB connector 21b, which is connected to another electronic device. Examples of an electronic device that serves as the connection origin includes a personal computer (hereinafter referred to as "PC 22") and an AC adapter 23. It is only required that the other electronic device serving as the connection origin be applicable to USB communication and may be a Personal Digital Assistant (PDA), a mobile phone, a portable game machine, a USB hub, and the like.

When detecting a USB connection in a power OFF state (standby mode), the electronic still camera 11 charges a rechargeable battery 41 (shown in FIG. 3) with bus power supplied through the USB cable 21.

As shown in FIG. 2, the AC adapter 23 includes a plug 24, which is connectable to an outlet for commercial AC power (e.g., AC 100V), converts the AC power to DC power, and outputs direct current with a predetermined voltage (e.g., 5V). The AC adapter 23 supplies the direct current with the predetermined voltage (e.g., 5V) to the electronic still camera 11 through the USB cable 21, which is connected to its USB connector (not shown). The AC adapter 23 may be a genuine AC adapter 23a, which is sold for exclusive use to supply power to the electronic still camera 11, or a non-genuine AC adapter 23b. The standard-specified information of the genuine AC adapter 23a, such as the rated current, is known (e.g., the known rated current is a predetermined value in the range of 500 mA to 1000 mA). However, the standard-specified information of the non-genuine AC adapter 23b, such as the rated current, is not known.

When power supply voltage can be supplied as bus power from an upper level device (e.g., USB host such as the PC 22 or a PDA) to a lower level device (USB device) through the USB cable 21 with the bus power method, USB is applicable to plug-and-play and also to hot plugging, which allows for connection and disconnection of the USB cable 21 in an active state. Further, in USB, two currents, 100 mA and 500 mA, are specified as the maximum current (specified current) that can be supplied from an electronic device serving as an upper level device (PC 22 etc.) to a lower level device (bus power device). When the total current consumed by the connected lower level device exceeds the specified current (100 mA or 500 mA), this may cause unstable operation or unstable charging due to lack of power.

The power supply voltage (rated voltage) that is suppliable by the genuine AC adapter 23a is set to be outside the USB specified voltage range (4.40 V to 5.25 V in the present example) and greater than or equal to the rated voltage (fully charged voltage) of the rechargeable battery 41 (4.2 V in the present example). In the present example, a voltage exceeding 5.25 V cannot be used. Specifically, the rated voltage of the genuine AC adapter 23a is set to be greater than the rated voltage (4.2 V) of the rechargeable battery 41 and less than the lower limit of the USB specified voltage (4.40 V). For example, the rated voltage of the genuine AC adapter 23a is set at "4.3V".

The circuit configuration of the electronic still camera 11 will now be described with reference to the block diagram of FIG. 3.

Figure 3:
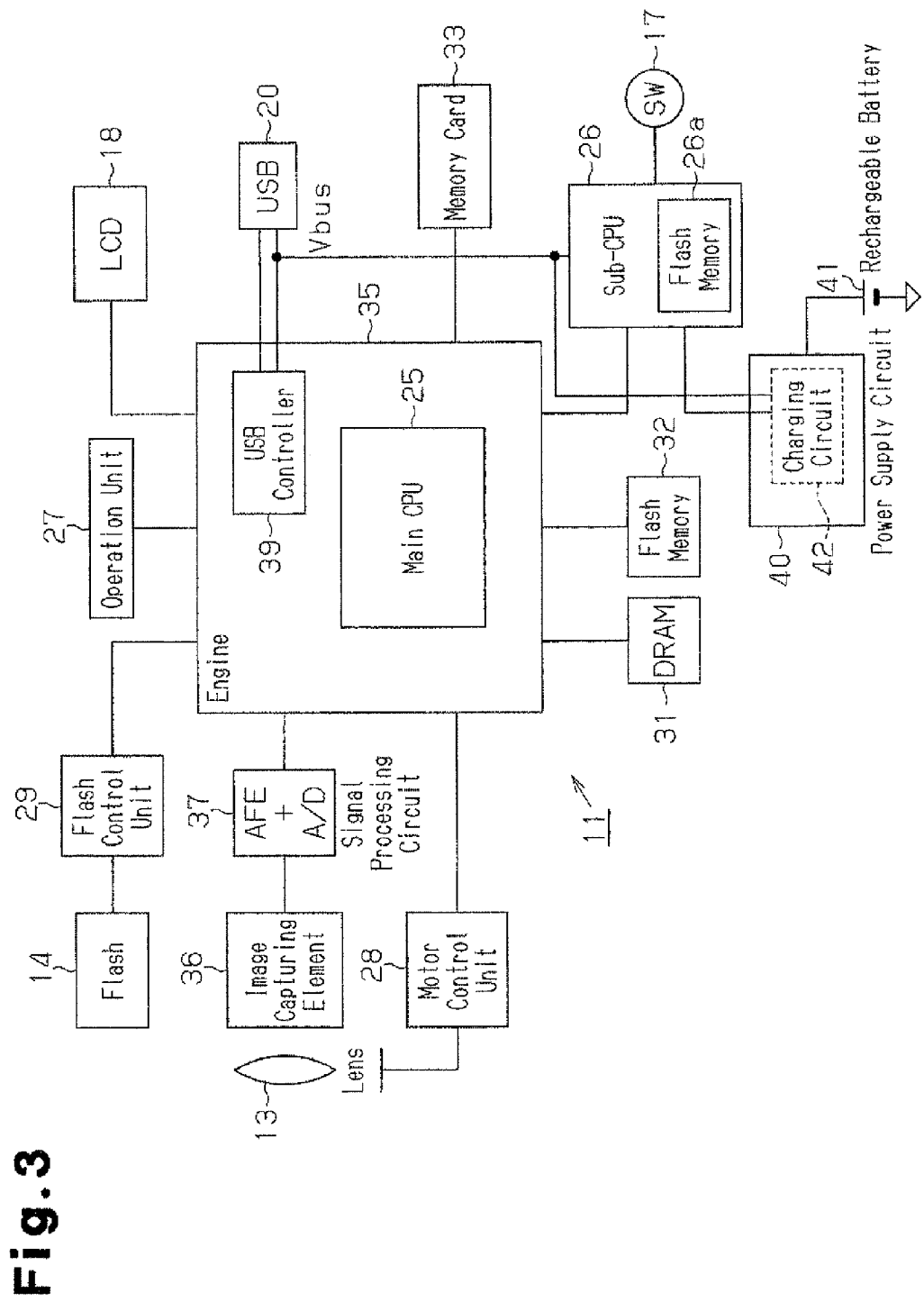
FIG. 3 is a block diagram showing the electrical configuration of the electronic still camera shown in FIG. 1.

As shown in FIG. 3, the electronic still camera 11 includes an engine 35, which performs various types of processing such as image processing. The electronic still camera 11 includes a main CPU 25 and a sub-CPU 26. The main CPU 25 is arranged in the engine 35 and executes predetermined control programs to centrally control various operations of the electronic still camera 11. The sub-CPU 26 serves as a control unit mainly responsible for power supply control. The main CPU 25 and the sub-CPU 26 are communicable with each other.

An operation unit 27 including the above-mentioned release button 16 and the like, a motor control unit 28, a flash control unit 29, a DRAM 31 (frame memory), a flash memory 32 (non-volatile memory), a memory card 33 (e.g., SD card), the LCD 18, and the USB connector 20 are connected to the main CPU 25.

The electronic still camera 11 includes a variable optical system, which is formed by an optical lens group including the image capturing lens unit 13 (only the image capturing lens 13 is shown in FIG. 3), an aperture, a shutter, and the like. The motor control unit 28 performs focusing, aperture adjustment, shutter control, and the like in response to a command from the main CPU 25. The main CPU 25 performs a predetermined exposure calculation in response to a photoelectric converted signal from a light measurement element (not shown) to control the shutter and aperture based on the exposure calculation result when the shutter is released. Specifically, the motor control unit 28 includes a lens drive motor, which is driven and controlled by a command from the main CPU 25. The motor control unit 28 drives the motor to drive the image capturing lens unit 13 (movable lens) with the motor and change the zoom magnification (focal length) and perform focusing. The motor control unit 28 drives an aperture motor to adjust the opening diameter of the aperture to obtain the aperture value that is obtained when the main CPU 25 performs a predetermined exposure calculation using the luminance of the captured subject that is detected from image data. The motor control unit 28 drives a shutter motor to drive and control the shutter to obtain an exposure time that is determined through the exposure calculation performed by the main CPU 25.

The flash control unit 29 performs a light emission control on the flash 14 in accordance with a command from the main CPU 25. The main CPU 25 determines the color temperature of the necessary emission light based on color information of the ambient light acquired by the light measurement element. Then, the main CPU 25 transmits a light emission color control signal to the flash control unit 29 so that the flash 14 emits light in correspondence with the determined color temperature.

The electronic still camera 11 includes an image capturing element 36. Light flux from an image-captured subject passes through the variable optical system. The image capturing element 36 forms an image from the light of the captured subject at an image side of the image capturing lens unit 13. The image capturing element 36, which includes a complementary metal oxide semiconductor (CMOS) image sensor or a charge coupled device (CCD) image sensor, stores signal charges corresponding to the subject image formed on an imaging plane and outputs the accumulated signal charges as an analog signal, which is referred to as a pixel signal.

The output side of the image capturing element 36 is connected to a signal processing circuit 37. The signal processing circuit 37 includes an analog front end (AFE) and an A/D converter. The AFE, which is controlled by the main CPU 25, performs sampling (correlation double sampling) on the pixel signal, which has undergone photoelectric conversion by the image capturing element 36, at a predetermined timing and amplifies the sampled result to a predetermined signal level based on, for example, ISO sensitivity. The A/D converter converts the amplified image signal (analog signal) output from the AFE portion to a digital signal and outputs the digital-converted image data to the engine 35. The engine 35 generates a predetermined image signal by performing image processing, such as contour compensation, gamma conversion, white balance processing, and the like, on the digital image signal output from the A/D converter. The image signal generated by the engine 35 is temporarily stored in the DRAM 31, which functions as a buffer memory.

Then, the main CPU 25 reads the image data from the DRAM 31, performs JPEG data compression or on the data, and stores the compressed image data in a memory card 33. The main CPU 25 reads captured image data from the memory card 33, expands the image data, and stores the image data in the DRAM 31. The main CPU 25 also displays an image of the image data on the LCD 18 via an LCD drive circuit (not shown).

The engine 35 includes a USB controller 39, which is connected to the USB connector 20. When the USB connector 21a is connected to the USB connector 20 so that the electronic still camera 11 is USB connected to another electronic device when the power of the electronic still camera 11 is on, the USB controller 39 performs a communication complying with the USB communication protocol with the other electronic device, which serves as a connection origin. When the power of the electronic still camera 11 is off, the sub-CPU 26 is supplied with power supply voltage Vbus so that the sub-CPU 26 detects connection of the USB connector 21a (connection of another electronic device) to the USB connector 20. That is, the sub-CPU 26 detects USB connection when the power of the electronic still camera 11 is off.

The sub-CPU 26 is connected to the power switch 17 and a power supply circuit 40. The power supply circuit 40 is connected to the rechargeable battery 41. The sub-CPU 26 controls the power supply circuit 40 based on an operation signal input from the power switch 17 to switch on or off the power of the electronic still camera 11. In a power on state, the power supply circuit 40 is driven by a command from the sub-CPU 26, a plurality of predetermined voltages are generated from the power supply voltage of the rechargeable battery 41, and each section of the electronic still camera 11 is supplied with the necessary power supply voltage. When a predetermined time elapses in a power on state without any image capturing operation or operation of the operation unit 27 being performed with the electronic still camera 11, the sub-CPU 26 controls the power supply circuit 40 to switch off the power of the electronic still camera 11. In a power off state, the power supply circuit 40 stops outputting power supply voltage although it continues to supply voltage to some circuits such as the sub-CPU 26 or a timing counter. In the present embodiment, a lithium-ion battery or the like is used as the rechargeable battery 41. Other rechargeable batteries having a rated voltage that can be charged with USB specified voltage may also be used. Furthermore, in the present embodiment, the rechargeable battery 41 is removable from a battery box of the electronic still camera 11 and thus replaceable by the user. However, the rechargeable battery 41 may be fixed in the electronic still camera 11 and irremovable by the user.

The power supply circuit 40 shown in FIG. 3 includes a charging circuit 42 for charging the rechargeable battery 41. In the present embodiment, at least the sub-CPU 26 and the power supply circuit 40 form a charger that charges the rechargeable battery 41. The sub-CPU 26 includes a flash memory 26a, which stores a charging control process routine illustrated in the flowchart of FIG. 5. If a USB connection is detected when the power of the electronic still camera 11 is off, the sub-CPU 26 executes the program to perform the charging control on the rechargeable battery 41.

Figure 4:
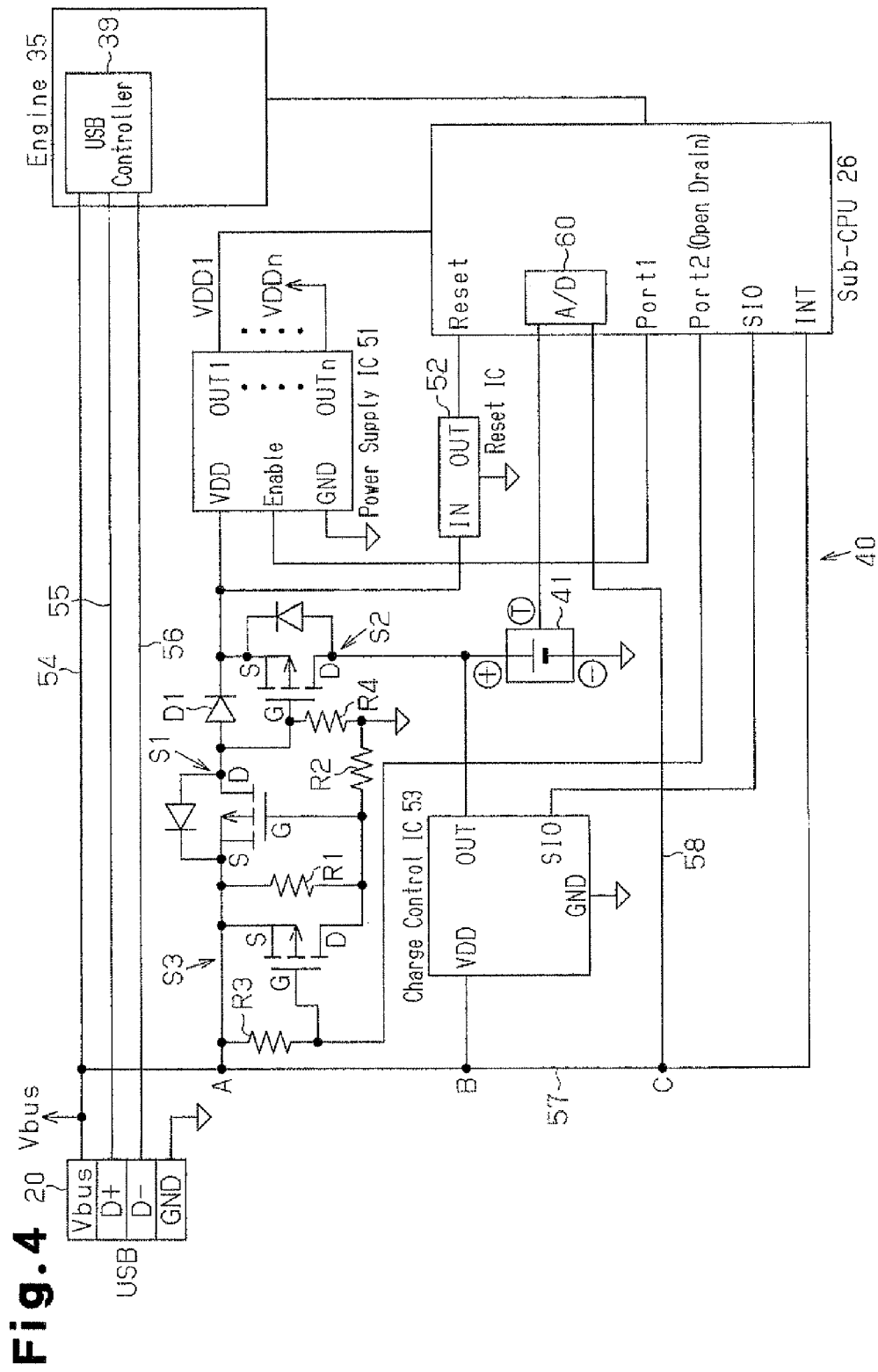
FIG. 4 is a block diagram showing the electrical configuration of a charger arranged in the electronic still camera of FIG. 1.

FIG. 4 is a block diagram showing the engine 35, the sub-CPU 26, and the power supply circuit 40. The power supply circuit 40 includes a power supply IC 51, a reset IC 52, a charge control IC 53 serving as a charging unit, a first switch element S1, a second switch element S2, and a third switch element S3.

The USB controller 39 in the engine 35 is connected to the USB connector 20 by a power supply line 54 of the power supply voltage Vbus, a D+ differential signal line 55, and a D− differential signal line 56. The USB cable 21 includes a Vbus power supply line and GND power supply line (both not shown) and a D+differential signal line and D− differential signal line (both not shown). The Vbus power supply line and GND power supply line are respectively connected to a Vbus terminal and a GND terminal of the USB connector 20 when the USB connectors 20 and 21a are connected. The D+ differential signal line and D− differential signal line are respectively connected to the D+ terminal and the D− terminal of the USB connector 20 when the USB connectors 20 and 21a are connected.

A wire 57 branched from the power supply line 54 is connected to an interruption (INT) terminal of the sub-CPU 26. Node A in the wire 57 is connected to the VDD terminal of the power supply IC 51 via the first switch element S1 and a diode D1, which are connected in series. The rechargeable battery 41 has a positive electrode connected to the VDD terminal of the power supply IC 51 via the second switch element S2 and a grounded negative electrode. The gate terminal G of the second switch element S2 is connected to the anode terminal of the diode D1. The diodes in each switch element S1 and S2 are parasitic diodes.

The source terminal S and the gate terminal G of the first switch element S1 are connected via a resistor R1. The source terminal S of the third switch element 53 is connected to the source terminal S of the first switch element S1, and the drain terminal D of the third switch element S3 is connected to the gate terminal G of the first switch element S1. The gate terminal G of the first switch element 51 and the drain terminal D of the third switch element S3 are both grounded via a resistor R2.

Node A and the gate terminal G of the third switch element S3 are connected via a resistor R3. The gate terminal G of the third switch element 53 is also connected to a Port 2 terminal (open drain) of the sub-CPU 26. The gate terminal G of the second switch element S2 is grounded via a resistor R4. In the present embodiment, the first to the third switch elements S1 to S3 are configured by a p-channel MOS field effect transistor (MOSFET).

The reset IC 52 has an IN terminal connected to the source terminal S of the second switch element S2 and an OUT terminal connected to a Reset terminal of the sub-CPU 26. The Port 1 terminal of the sub-CPU 26 is connected to an Enable terminal of the power supply IC 51.

If the input voltage to the INT terminal of the sub-CPU 26 has an L level when the USB connectors 20 and 21a are unconnected, the sub-CPU 26 opens the Port 2 terminal, which is connected to the gate terminal G of the third switch element S3. Thus, in a USB unconnected state (unconnected state of USB connectors 20 and 21a), the first switch element S1 is deactivated and the voltage applied to the gate terminal G of the second switch element S2 has an L level. This deactivates the second switch element S2.

If the power switch 17 is turned on when the voltage input to the INT terminal has an L level, the sub-CPU 26 determines whether or not the power supply voltage Vbatt of the rechargeable battery 41 input to the IN terminal of the reset IC 52 is greater than or equal to a predetermined voltage. When the power supply voltage Vbatt is greater than or equal to the predetermined voltage, the sub-CPU 26 sends an enable signal from the Port 1 terminal to the Enable terminal of the power supply IC 51. When the power supply voltage Vbatt is less than the predetermined voltage, the sub-CPU 26 does not output the enable signal to the power supply IC 51. Therefore, if the power switch 17 is turned on when the electronic still camera 11 is in the USB unconnected state and as long as the power supply voltage Vbatt is greater than or equal to the predetermined voltage, the power supply IC 51 is driven based on the enable signal input from the sub-CPU 26.

In other words, when the enable signal is input to the Enable terminal, the power supply IC 51 generates a plurality of power supply voltages VDD2, . . . , VDDn from the power supply voltage Vbus or the power supply voltage Vbatt input from the VDD terminal and outputs the power supply voltages from output terminals OUT2, . . . OUTn. For instance, the voltage VDD2 is supplied to the main CPU 25, the voltage VDD3 is output to the motor control unit 28, and the voltage VDD4 is output to the flash control unit 29. The power supply IC 51 constantly supplies the power supply voltage VDD1 from the output terminal OUT1 to the sub-CPU 26 even when the power is off. The sub-CPU 26 is thus driven even when the power is turned off and is thereby capable of detecting the connection and disconnection of the USB cable 21 to and from the USB connector 20, detecting the operation of various operation switches (operation buttons), and processing the time measured by timing counter.

When the USB connector 21a is connected to the USB connector 20 and the power supply voltage Vbus (H level) is input to the INT terminal of the sub-CPU 26, the sub-CPU 26 sends the enable signal from the Port 1 terminal to the Enable terminal of the power supply IC 51 to drive the power supply IC 51. The Port 2 terminal remains open so that an H level voltage is applied to the gate terminal G of the third switch element S3. This deactivates the third switch element S3. As a result, the first switch element S1 is activated. In this state, an H level voltage of H level is applied to the gate terminal G of the second switch element S2. This deactivates the second switch element S2. Thus, the power supply voltage supplied to the VDD terminal of the power supply IC 51 switches from the power supply voltage Vbatt of the rechargeable battery 41 to the bus power of the USB cable 21, namely, the power supply voltage Vbus.

If the voltage of the rechargeable battery 41 is less than a predetermined voltage when the electronic still camera 11 is in an USB unconnected state, the supply of power from the rechargeable battery 41 to the sub-CPU 26 is also stopped. Thus, the sub-CPU 26 stops functioning and is deactivated. In this case, the output of the Port 2 terminal becomes unstable (Hi-Z etc.). Even in such a state, when the USB cable 21 is connected and the power supply voltage Vbus is supplied, an H level voltage based on the power supply voltage Vbus is applied to the gate terminal G of the third switch element S3 via the resistor R3. This deactivates the third switch element S3. As a result, the first switch element S1 is activated and the second switch element S2 is deactivated.

The sub-CPU 26 includes an A/D converter circuit 60. The rechargeable battery 41 incorporates a temperature sensor (not shown) and includes a temperature terminal T, which outputs a temperature detection signal of the temperature sensor. The A/D converter circuit 60 digitally converts an analog detection signal corresponding to the temperature of the rechargeable battery 41 output from the temperature terminal T to generate a digital signal, which is input to the sub-CPU 26. Based on the detected temperature represented by the digital value, the sub-CPU 26 determines the temperature of the rechargeable battery 41. In this case, the sub-CPU 26 instructs the charge control IC 53 to charge the rechargeable battery 41 when the temperature of the rechargeable battery 41 is within a chargeable temperature range (e.g., 40° C. or less). The voltage at node C in the wire 57 (i.e., power supply voltage Vbus), which is connected to the power supply line 54, is input to the A/D converter circuit 60 via a wire 58. The sub-CPU 26 receives a digital value corresponding to the value of the power supply voltage Vbus as a measurement voltage Vm via the A/D converter circuit 60. In the present embodiment, the measurement voltage Vm corresponds to a measurement value. The wires 57 and 58 and the A/D converter circuit 60 form a measurement unit.

The charge control IC 53 is an integrated circuit that controls the value of the charging current when charging the rechargeable battery 41. The VDD terminal of the charge control IC 53 is connected to node B in the wire 57. The power supply voltage Vbus is thus supplied to the VDD terminal of the charge control IC 53 when the USB connectors 20 and 21a are connected. An OUT terminal of the charge control IC 53 is connected to the positive electrode of the rechargeable battery 41. An SIO terminal of the charge control IC 53 is connected to an SIO terminal of the sub-CPU 26. The sub-CPU 26 transmits in serial charging control command data from the SIO terminal to the SIO terminal of the charge control IC 53 to set a charging current value and instruct the charge control IC 53 to perform charging at the set current value. When receiving a charging initiation command, the charge control IC 53 charges the rechargeable battery 41 while controlling the value of the charging current output from the OUT terminal so as to match the set current value based on the power (bus power) of the power supply voltage Vbus supplied to the VDD terminal.

Figure 5:
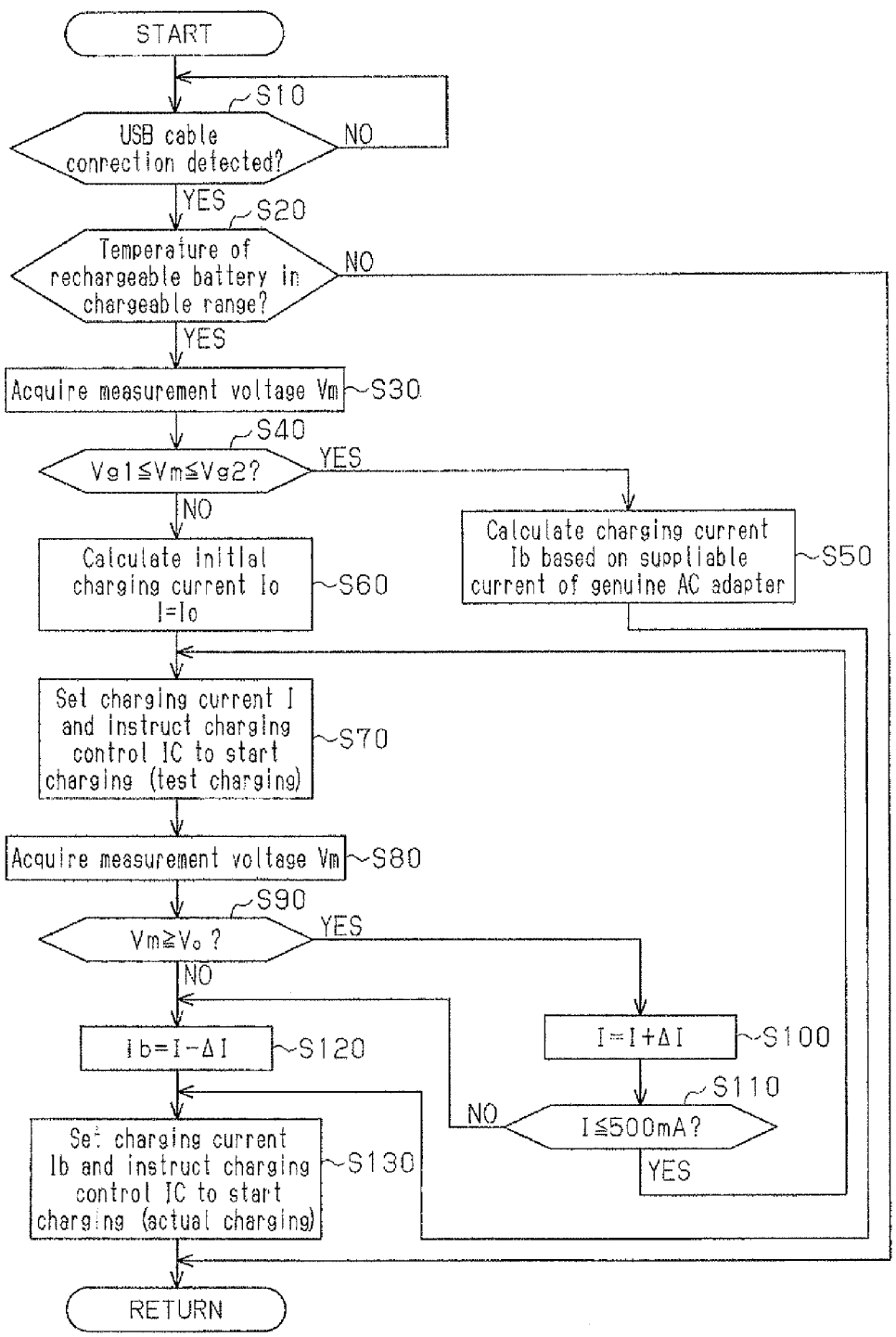
FIG. 5 is a flowchart showing a charging process performed by the charger of FIG. 4.

The charging control process will now be discussed. The charging control process is executed as shown in the flowchart of FIG. 5. The charging control process of FIG. 5 is executed by the sub-CPU 26 regardless of whether the power of the electronic still camera 11 is on or off.

First, in step S10, the sub-CPU 26 determines whether or not connection of a USB cable has been detected. The sub-CPU 26 proceeds to step S20 when connection of a USB cable has been detected and waits until a connection is detected when the connection of a USB cable is not detected. In the present embodiment, the wire 57 and the sub-CPU 26 performing the determination of step S10 form a detection unit.

In step S20, the sub-CPU 26 determines whether or not the temperature of the rechargeable battery 41 is within the chargeable range. The sub-CPU 26 proceeds to step S30 when the temperature of the rechargeable battery 41 is within the chargeable range and terminates the charging control process routine when the temperature is not within the chargeable range (i.e., outside the chargeable range).

In step S30, the sub-CPU 26 acquires the measurement voltage Vm.

In step S40, the sub-CPU 26 determines whether or not the measurement voltage Vm is the rated voltage of the genuine AC adapter 23a (i.e., whether $Vg1 \leq Vm \leq Vg2$ is satisfied). When the measurement voltage Vm is within the range of Vg1 to Vg2, the sub-CPU 26 determines that the electronic device serving as the connection origin is the genuine AC adapter 23a. In this example, Vg1 is the rated voltage 4.2 V of the rechargeable battery 41, and Vg2 is 4.39 V, which is less than the lower limit 4.40 V of the USB specified voltage. Further, in this example, the rated voltage of the genuine AC adapter 23a is set to 4.3 V and thereby sets $Vg1 \leq Vm \leq Vg2$. The sub-CPU 26 proceeds to step S50 when $Vg1 \leq Vm \leq Vg2$ is satisfied, and proceeds to step S60 when $Vg1 \leq Vm \leq Vg2$ is not satisfied. If $Vg1 \leq Vm \leq Vg2$ is not satisfied, the sub-CPU 26 executes following steps S60 to 5120 to determine the appropriate charging current value Ib for charging the rechargeable battery 41.

First, in step S60, the sub-CPU 26 calculates an initial charging current Io. The initial charging current Io is calculated as a value obtained by subtracting the current consumed during charging operation from the minimum value of the USB standard, which is 100 mA. For instance, if the consumption current of the sub-CPU 26, the charge control IC 53, and the like that are driven during the charging is 20 mA (known consumption current), the sub-CPU 26 sets 100−20=80 mA as the initial charging current Io. The rechargeable battery 41 is charged even when the electronic still camera 11 is turned on as long as there is enough bus power. In such a case, for example, when the LCD 18 is driven, the initial charging current Io is calculated by further subtracting the consumption current of the display system including the LCD 18.

In step S70, the sub-CPU 26 sets the charging current and instructs the charge control IC 53 to start charging. In this specification, the charging performed with the charging current I is referred to as "test charging". Since the test charging is performed for the first time, the sub-CPU 26 sets the initial charging current Io as the charging current I. When the sub-CPU 26 instructs test charging with the initial charging current Io for the first time, the charge control IC 53 charges the rechargeable battery 41 with the initial charging current Io.

In following step S80, the sub-CPU 26 acquires the present measurement voltage Vm.

In step S90, the sub-CPU 26 determines whether or not the measurement voltage Vm is greater than or equal to a threshold value Vo (threshold voltage) (i.e., whether $Vm \geq Vo$ is satisfied). The threshold value Vo is a value corresponding to the lowest voltage value of the measurement voltage Vm that guarantees the charging of the charge control IC 53 (charging unit). The threshold value Vo is set to include a slight margin so that the charging may be reliably guaranteed even if a slight voltage fluctuation or the like occurs. Thus, when $Vm \geq Vo$ cannot be satisfied, the sub-CPU 26 determines that the monitored measurement voltage Vm is in an unstable range that cannot guarantee the charging of the charge control IC 53. When $Vm \geq Vo$ is satisfied, the sub-CPU 26 determines that the monitored measurement voltage Vm is a value in a stable range that can guarantee the charging of the charge control IC 53. If determined that $Vm \geq Vo$ is satisfied, the sub-CPU 26 proceeds to step S100.

In step S100, the sub-CPU 26 increases the charging current I by ΔI. That is, the sub-CPU 26 increases the charging current I by one step from the initial charging current Io in step S100 to monitor the measurement voltage Vm while increasing the charging current I in steps by ΔI (e.g. 50 mA) during the test charging. The current value increment ΔI may be any value that allows for test charging to be performed for a number of times until the charging current I, which starts from the initial charging current Io, reaches the maximum current value 500 mA of the USB standard. However, the current value increment ΔI is preferably set to a predetermined value within a range of 10 to 100 mA.

In step S110, the sub-CPU 26 determines whether or not the charging current I is less than or equal to 500 mA (i.e., whether or not $I \leq 500$ mA is satisfied). That is, the sub-CPU 26 determines whether or not the charging current I has not reached the maximum current value "500 mA" of the USB standard. This is because the charging current I cannot be further increased when it exceeds the USB standard maximum current value of "500 mA" (when $I \leq 500$ mA is not satisfied). Therefore, the sub-CPU 26 determines whether or not the charging current I during test charging exceeds the upper limit.

When $I \leq 500$ mA is satisfied, the charging current I has not yet exceeded the upper limit. Thus, the sub-CPU 26 returns to step S70.

In step S70, the sub-CPU 26 sets the charging current instructs the charge control IC 53 to start charging. This time, the charging start command is performed with the current value (Io+ΔI), which is set as the charging current I that has been incremented by the current value increment ΔI from the initial charging current Io. The charge control IC 53 charges the rechargeable battery 41 with the charging current I=Io+ΔI.

The sub-CPU 26 then acquires the present measurement voltage Vm (S80) and determines whether or not Vm≥Vo is satisfied (S90). When Vm≥Vo is satisfied, the sub-CPU 26 again increases the charging current I by the current value increment ΔI (I=Io+2·ΔI) (S100). When I≤500 mA is satisfied (S110), the sub-CPU 26 sets the charging current I(=Io+2·ΔI) and instructs the charge control IC 53 to start charging.

Subsequently, in the same manner, the sub-CPU 26 repeats steps S70 to S110 until one of either the measurement voltage Vm becomes smaller than the threshold value Vo (Vm≥Vo is not satisfied in S90) or the charging current I exceeds 500 mA (I≤500 mA is not satisfied) is satisfied while repetitively increasing the charging current I by the current value increment ΔI.

Test charging is performed an n number of times while increasing the charging current I by ΔI from Io to Io+ΔI, Io+2ΔI, Io+3ΔI, ..., and Io+(n−1)·ΔI (where "n" indicates nth time). If either one of Vm≥Vo (S90) and I≤500 mA (S110) is not satisfied at the nth time, the sub-CPU 26 proceeds to step S120. That is, when Vm≥Vo (S90) is not satisfied and the charging current value I is in an unstable range in which charging is unstable or when reaching the maximum current value 500 mA of the USB standard, the sub-CPU 26 proceeds to step S120.

In step S120, the sub-CPU 26 calculates In=I−ΔI. When the charging current value I is in the unstable range win which charging may be unstable, the sub-CPU 26 returns the charging current value I to the preceding value and uses Ib=I−ΔI at which charging is stable. That is, if the monitored measurement voltage is in the unstable range in which the charging operation of the charge control IC 53 (charging unit) cannot be guaranteed, the sub-CPU 26 uses the charging current I used in the preceding test charging as the charging current value Ib. The charging current value Ib is the maximum value of the charging currents I that were used until the preceding test charging was performed and is a value that maintains the power supply voltage Vbus (measurement voltage Vm) in the range that guarantees stable charging. When the charging current value I exceeds the maximum current value 500 mA of the USB standard, the sub-CPU 26 also uses Ib=I−ΔI (≤500 mA), which is the preceding charging current value I (>500), as the charging current value Ib.

After the charging current value Ib is determined through the above test charging (S60 to S120), the sub-CPU 26 sets the charging current Ib and instructs the charge control IC 53 to start charging in step S130. The charging (actual charging) of the rechargeable battery 41 is performed with the determined charging current Ib by the charge control IC 53. As a result, the rechargeable battery 41 is stably charged.

If the suppliable current of another electronic device serving as a connection origin is 100 mA, Vm≥Vo becomes unsatisfied when the charging current value I has a relatively low current during the test charging, and the rechargeable battery 41 is either charged by a small charging current or not charged at all. If the suppliable current of another electronic device serving as the connection origin is 500 mA, Vm≥Vo is not satisfied or I≤500 mA is not satisfied when the charging current value I is a relatively high current during the test charging, and the rechargeable battery 41 is charged with the relatively high preceding charging current Ib (Ib<500).

When the non-genuine AC adapter 23*b* is used, the condition of Vg1≤Vm≤Vg2, which is for the genuine AC adapter 23*a*, is not satisfied. Thus, the appropriate charging current value Ib corresponding to the unknown specified current of the non-genuine AC adapter 23*b* is determined by performing the test charging (S60 to S120). As a result, the rechargeable battery 41 is stably charged even when the other electronic device serving as a connection origin is the non-genuine AC adapter 23*b*.

Since Vg1≤Vm≤Vg2 is satisfied when the genuine AC adapter 23*a* is used, the charging current Ib is obtained through calculations based on the known suppliable current Ig (specified current value) of the genuine AC adapter 23*a* (S50). Thus, the rechargeable battery 41 is stably charged with the genuine AC adapter 23*a*.

When one part of the electronic still camera 11 is driven during the actual charging and additional power is thereby consumed, a command for changing the charging current value in accordance with the monitoring result of the measurement voltage is output. Therefore, the rechargeable battery 41 is stably charged and subtly affected by the driving of another part of the electronic still camera 11.

As described above in detail, the first embodiment has the advantages described below.

(1) The sub-CPU 26 monitors the measurement voltage Vm while increasing the charging current value by ΔI from the initial charging current Io. When the monitored measurement voltage Um enters the unstable range in which the charging of the charge control IC 53 (charging unit) cannot be guaranteed, the sub-CPU 26 determines the charging current value lb so that the measurement voltage Vm would not be in the unstable range. This stably charges the rechargeable battery 41.

(2) The sub-CPU 26 determines a charging current Ib that is appropriate regardless of whether the other electronic device serving as the connection origin uses the USB specified current of 100 mA or 500 mA.

(3) If the charging current I reaches a value greater than or equal to the USB specified maximum current of 500 mA during the test charging, the sub-CPU 26 uses the preceding charging current value Ib (=I−ΔI) for the actual charging and determines the charging current Ib to be less than the upper limit (smaller than 500 mA) of the USB standard. This stably charges the rechargeable battery 41 and avoids unstable charging with excessive charging current.

(4) Test charging is performed to determine the appropriate charging current value Ib. Thus, even during connection of the non-genuine AC adapter 23*b*, of which suppliable current value (specified current value) is not known, the rechargeable battery 41 is stably charged.

(5) The suppliable voltage (specified current value Vg) of the genuine AC adapter 23*a* is set as a value that is in the voltage range in which the rechargeable battery 41 is charged and in a range (Vg1≤Vg≤Vg2) that differs from the USB specified voltage (=5V). The sub-CPU 26 determines that the other electronic device serving as the connection origin is the genuine AC adapter 23*a* when the initial measurement voltage Vm, which is obtained before starting the test charging, satisfies the condition of Vg1≤Vm≤Vg2. That is, connection of the genuine AC adapter 23*a* is determined from the value of the measurement voltage Vm without performing the test charging. Therefore, the sub-CPU 26 determines the charging current Ib based on the known suppliable current Ig of the genuine AC adapter 23*a*. This stably charges the rechargeable battery 41.

(6) The sub-CPU 26 monitors whether or not the measurement voltage Vm is greater than or equal to the threshold value Vo by directly using the detection value of the power supply voltage Vbus as the measurement value (measurement voltage Vm). This eliminates the need to perform unnecessary calculations of the measurement value and allows for simple monitoring.

(7) The sub-CPU 26 does not need to know the specified current of another electronic device that serves as a connection origin. Thus, the main CPU 25 does not need to be activated even when the USB connection is detected while the power is off.

[Second Embodiment]

A second embodiment will now be discussed with reference to FIG. 6. The second embodiment differs from the first embodiment in that the main CPU 25 is activated to acquire the standard-specified current information (specified power supply information) of another electronic device serving as the connection origin with the USB communication. Otherwise, the structure of the electronic still camera 11 is the same as the first embodiment. Thus, only the contents of the charging control process will be described below in detail. In the present embodiment, at least the main CPU 25, the sub-CPU 26, and the power supply circuit 40 form the charger for charging the rechargeable battery 41.

Figure 6:
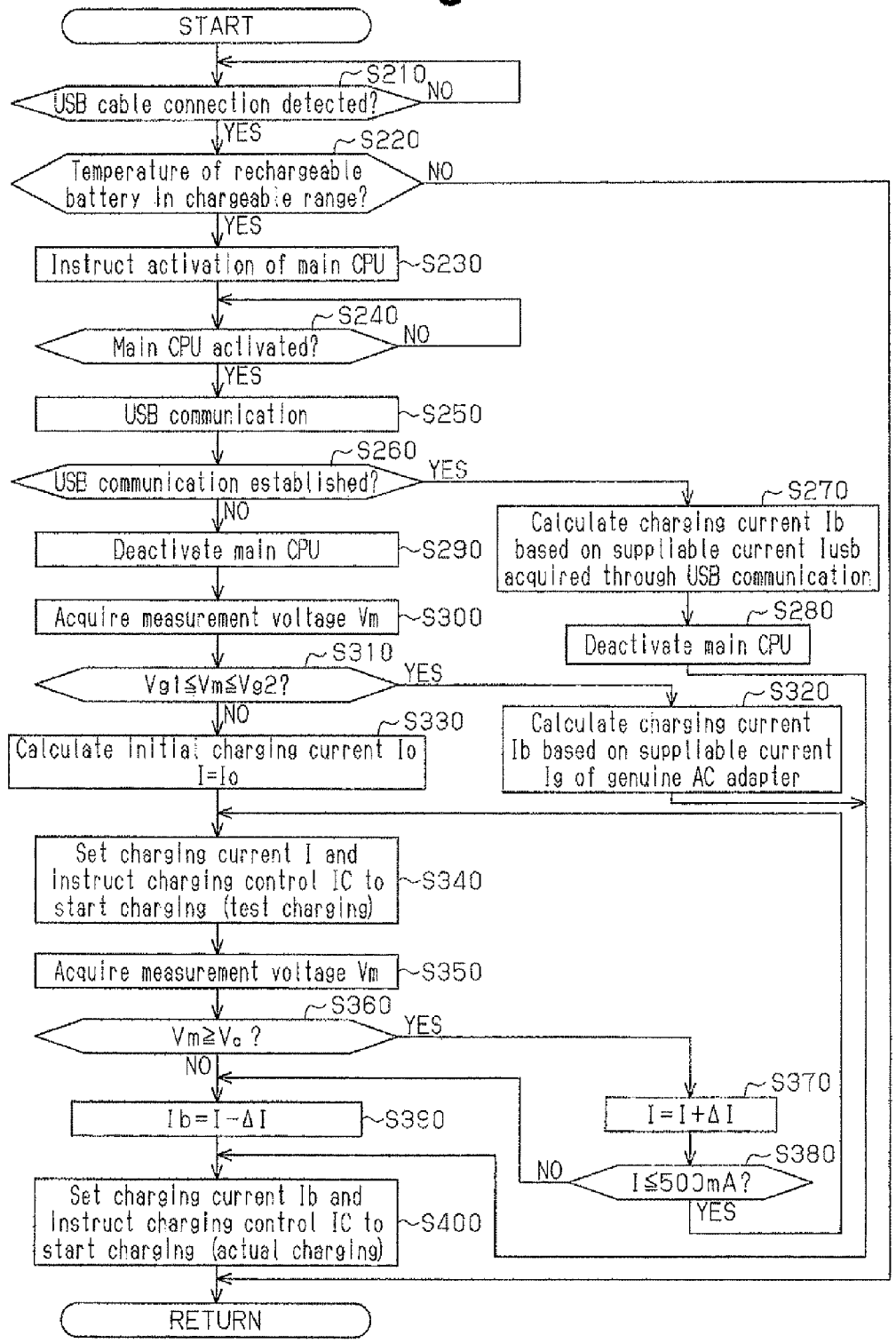
FIG. 6 is a flowchart showing a charging process according to a second embodiment of the present invention that is performed by the charger of FIG. 4.

Referring to FIG. 6, when the sub-CPU 26 detects connection of the USB cable 21 (affirmative determination in step S210) and determines that the temperature of the rechargeable battery 41 is in a chargeable range (affirmative determination in step S220), the sub-CPU 26 proceeds to step S230 and activates the main CPU 25. When the main CPU 25 is activated (affirmative determination in step S240), the main CPU 25 performs USB communication in step S250. In this case, if the other electronic device serving as the connection origin is a USB host (or upper level USB device) such as the PC 22, the main CPU 25 performs USB communication through the USB controller 39 with the other electronic device serving as the connection origin to acquire the suppliable current Iusb (specified current) from that other electronic device. The USB communication connection cannot be established if the other electronic device serving as the connection origin is an AC adapter 23. The main CPU 25 that performs USB communication in step S250 and acquires the standard-specified power supply information (information on specified current etc.) forms a power supply information acquiring unit.

In step S260, the sub-CPU 26 determines whether or not USB communication has been established. If USB communication has not been successful (affirmative determination in step S260), the sub-CPU 26 calculates the charging current Ib based on the suppliable current Iusb acquired through the USB communication by the main CPU 25 in step S270. In step S280, the sub-CPU 26 deactivates the main CPU 25. Then, the sub-CPU 26 sets the charging current Ib and instructs the charge control IC 53 to start charging in step S400. As a result, the rechargeable battery 41 is stably charged with the appropriate charging current Ib corresponding to the suppliable current Iusb acquired from the other electronic device serving as the connection origin. In the present embodiment, the suppliable current Iusb (e.g., information on whether 100 mA or 500 mA) acquired through USB communication in step S270 corresponds to specified current value information (specified power supply information).

If USB communication is not established in step S260 (negative determination in S260), the other electronic device serving as the connection origin is not a USB device and is an electronic device that cannot perform USB communication. Thus, the sub-CPU 26 determines that the other electronic device serving as the connection origin is an AC adapter. In the present embodiment, the sub-CPU 26 performing the determination process of step S260 forms a determination unit for determining that the other electronic device is an AC adapter when the power supply information acquiring unit cannot perform communication with the other electronic device. The main CPU 25 may function as a determination unit that notifies its determination result to the sub-CPU 26.

If USB communication is not established, the sub-CPU 26 deactivates the main CPU 25 in step S290 and acquires the measurement voltage Vm in step S300. Then, in step S310, the sub-CPU 26 determines whether or not the measurement voltage Vm is in the specified voltage range of the genuine AC adapter 23a (i.e., whether or not Vg1≤Vm≤Vg2 is satisfied). The sub-CPU 26 proceeds to step S320 if Vg1≤Vm≤Vg2 is satisfied and proceeds to step S330 if Vg1≤Vm≤Vg2 is not satisfied. If Vg≤Vm≤Vg2 is not satisfied in step S310, the sub-CPU 26 determines the appropriate charging current value with which the rechargeable battery 41 is to be charged through the processes of steps S330 to S390. The processes of S330 to S390 are similar to the processes of S60 to S120 in the first embodiment.

During test charging, when the measurement voltage Vm enters an unstable range in which it cannot be greater than or equal to the threshold value Vo (Vm≥Vo) (negative determination in step S360), the sub-CPU 26 sets the charging current Ib preceding the present charging current I (=I−Ib) as the actual charging in step S390. When determining that the charging current I exceeds the maximum current 500 mA of the USB standard (I≤500 mA is not satisfied) in step S380, the sub-CPU 26 sets the charging current Ib preceding the present charging current I (=I−Ib) as the actual charging in step S390. In the second embodiment as well, Thus, the charging current Ib is appropriately determined, and the rechargeable battery 41 is stably charged.

(8) In the second embodiment, the main CPU 25 acquires the suppliable current Iusb from the other electronic device serving as the connection origin when USB communication can be performed. Thus, the charge control IC 53 stably charges the rechargeable battery 41 with the charging current Ib based on the acquired suppliable current Iusb. The sub-CPU 26 performs test charging and determines the charging current Ib when USB communication is not established. Therefore, the sub-CPU 26 determines the appropriate charging current Ib, and the rechargeable battery 41 is stably charged by the charge control IC 53 even when the non-genuine AC adapter 23b is connected. When the genuine AC adapter 23a is connected, the sub-CPU 26 identifies the electronic device as the genuine AC adapter 23a from the value of the measurement voltage Vm and determines the charging current Ib based on the known suppliable current Ig. Thus, the rechargeable battery 41 is more stably charged compared to the charging current determined in the test charging.

[Third Embodiment]

A third embodiment will now be discussed with reference to FIG. 7. In the third embodiment, the measurement value differs from each of the above-described embodiments. More specifically, in each of the embodiments described above, the sub-CPU 26 controls the charging current amount Ib by directly using the measurement value (measurement voltage Vm). In the third embodiment, the sub-CPU 26 determines the voltage drop amount and the voltage drop rate based on the measurement (measurement voltages Vm and Vp) of the power supply voltage Vbus to control the charging current amount Ib using at least one of the voltage drop amount and the voltage drop rate as the measurement value. Otherwise, the structure of the electronic still camera 11 is the same as the first embodiment. Thus, only the contents of the charging control process will be discussed below in detail.

Figure 7:
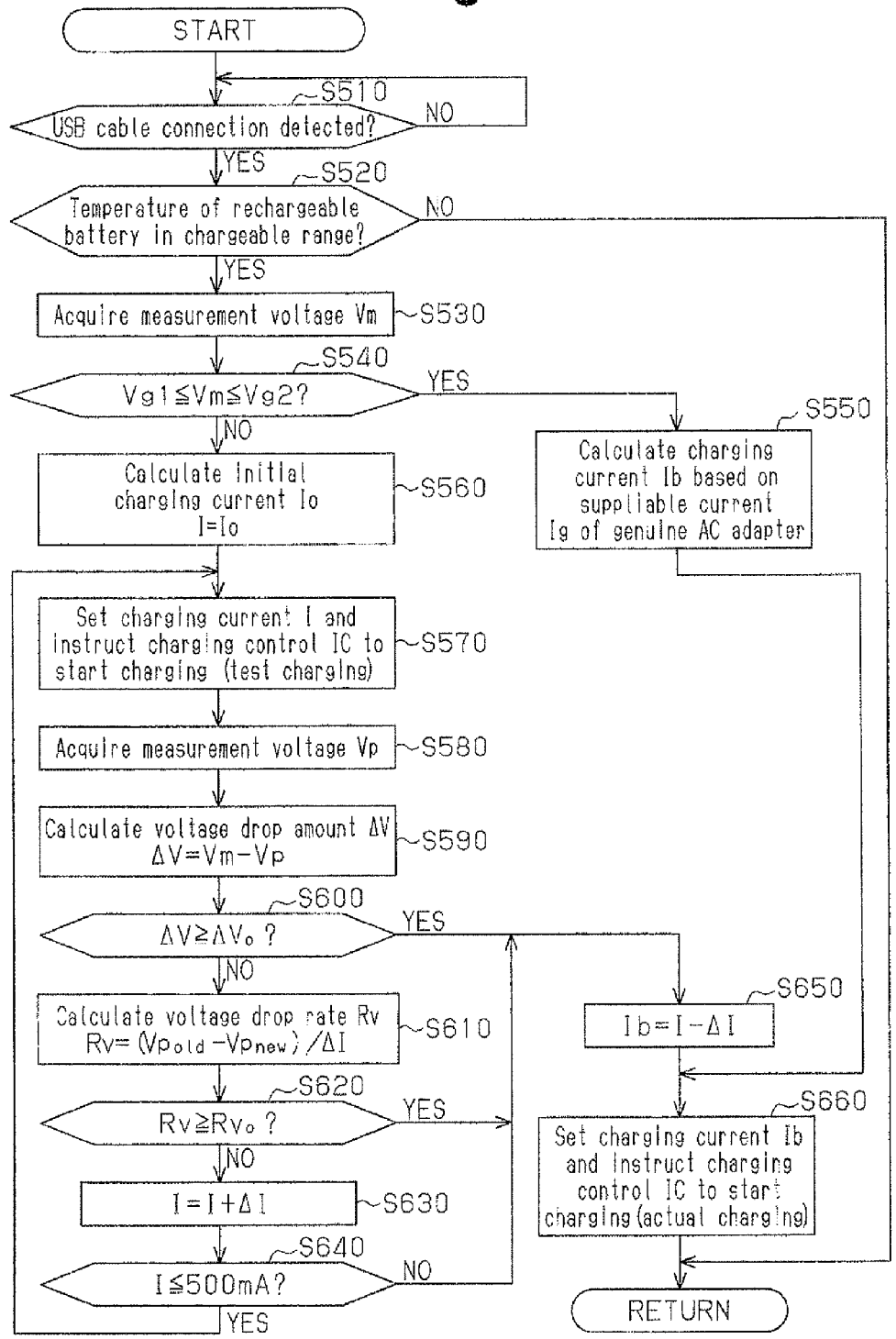
FIG. 7 is a flowchart showing a charging process according to a third embodiment of the present invention performed by the charger of FIG. 4.

As shown in FIG. 7, the processes of steps S510 to S550 and S660 are similar to the processes of steps S10 to S50 and S130 of FIG. 5. Hence, when the temperature of the rechargeable battery 41 is in the chargeable range (affirmative determination in S520) after detection of a USB cable connection (affirmative determination in S510), the sub-CPU 26 acquires the measurement voltage Vm (S530). If the measurement voltage satisfies the condition of Vg1≤Vg≤Vg2 (affirmative determination in S540), the sub-CPU 26 calculates the charging current Ib based on the suppliable current Ig of the genuine AC adapter 23a (S550), and performs the setting of the charging current Ib and instructs the charge control IC 53 to start charging (S660) to charge the rechargeable battery with the supply voltage from the genuine AC adapter 23a.

When the other electronic device that serves as the connection origin is an electronic device that is not the genuine AC adapter 23a, the sub-CPU 26 determines the appropriate charging current Ib by performing the processes of steps S560 to S650. First, in step S560, the sub-CPU 26 calculates the initial charging current Io (I=Io). In step S570, the sub-CPU 26 sets the charging current T and instructs the charge control IC 53 to start charging (test charging). The sub-CPU 26 then acquires the measurement voltage Vp obtained in the test charging under the present charging current I (=Io). The measurement voltage Vp is the same as the measurement voltage Vm in step S80 of FIG. 5. However, in the present embodiment, the measurement voltage during test charging is denoted as "Vp" to distinguish it from the measurement voltage Vm measured in step S530 before starting charging.

In step S590, the sub-CPU 26 calculates the voltage drop amount ΔV from the equation ΔV=Vm−Vp. The voltage drop amount ΔV indicates the voltage drop amount represented by the difference between the measurement voltage Vm obtained before charging is started and the measurement voltage Vp obtained in the present test charging. In the present embodiment, the measurement voltage Vm in step S530 corresponds to the "initial power supply voltage". The voltage drop amount ΔV of step S590 corresponds to the "voltage drop amount or the difference between the initial power supply voltage and the power supply voltage during charging".

In step S600, the sub-CPU 26 determines whether or not the voltage drop amount ΔV is greater than or equal to a threshold value ΔVo. If the voltage drop amount ΔV is greater than or equal to the threshold value ΔVo (set drop amount), this indicates that the power supply voltage Vbus has been lowered to an extent in which the charging of the rechargeable battery 41 becomes unstable. The sub-CPU 26 proceeds to step S610 if ΔV≥ΔVo is not satisfied and proceeds to step S650 if ΔV≥ΔVo is satisfied.

In step S610, the sub-CPU 26 calculates the voltage drop rate Rv from the equation Rv=(Vpold−Vpnew)/ΔI. Here, Vpold is the previous measurement voltage Vp, Vpnew is the present measurement voltage Vp, and ΔI is the incremented amount of the present charging current I from the preceding charging current I. In general terms, when the charging current is raised from the preceding value to the present value $I_n$, the voltage drop rate Rv is expressed by the equation Rv= $(V_{n-1}-V_n)/(I_{n-1}-I_n)$ using the previous measurement voltage $V_{n-1}$ and the present measurement voltage $V_n$. Here, n is the number of times test charging is performed. In the present example in which the charging current is increased by ΔI, the expression of $I_{n-1}-I_n=\Delta I$ is obtained. Thus, the ΔI is a constant in the test charging in which the charging current is increased by ΔI. The previous measurement voltage $V_{n-1}$ is the power supply voltage Vbus measured when performing charging with charging current $I_{n-1}$. The present measurement voltage $V_n$ is the power supply voltage Vbus measured when performing charging with the charging current $I_n$. When test charging is performed for the first time at the initial charging current Io, the first voltage drop rate Rv may be calculated using ΔI=Io. First, the determination by the voltage drop rate Rv may be omitted as long as test charging is performed for the first time.

As apparent from the above equation, the voltage drop rate Rv is a value indicating the proportion (ratio) of the voltage change amount between the previous measurement voltage $V_{n-1}$ and the present measurement voltage $V_n$ for the change amount (incremented current value) ΔI of the previous charging current $I_{n-1}$ and the present charging current $I_n$. When the charging current is raised by ΔI and the measurement voltage Vp (measurement value of power supply voltage Vbus) thereby suddenly falls for a large amount, this may indicate that the consumption current of the electronic still camera 11 has exceeded the USB specified current and the power supply voltage Vbus has become unstable. Therefore, in the present embodiment, the sub-CPU 26 determines that the charging current I has entered the unstable range in which stable charging cannot be performed when the voltage drop rate Rv becomes greater than or equal to the threshold value Rvo (set threshold value).

In step S620, the sub-CPU 26 determines whether or not the voltage drop rate Rv is greater than or equal to the threshold value Rvo. The sub-CPU 26 proceeds to step S630 when Rv≥Rvo is not satisfied and proceeds to step S650 when Rv≥Rvo is satisfied.

In step S630, the sub-CPU 26 increases the charging current I by the current value increment ΔI (I=I+ΔI) and repeats the processes of steps S570 to S640 until ΔV≥ΔVo is satisfied in S600, Rv≥Rvo is satisfied in S620, or I≤500 mA is not satisfied in S640. When raising the charging current I by ΔI during test charging, if the consumption current in the electronic still camera 11 exceeds the USB specified current and the power supply voltage Vbus becomes unstable, at least one of ΔV≥ΔVo or Rv≥Rvo is satisfied. Thus, the sub-CPU 26 proceeds to step S650. The sub-CPU 26 returns the charging current I to the preceding value and sets this value as the charging current Ib (=I−ΔI) for actual charging (S650). Then, the sub-CPU 26 sets the charging current Ib and instructs the charge control IC 53 to start charging (S660). The rechargeable battery 41 is stably charged with the charging current Ib that is determined in this manner.

In the present embodiment, an affirmative determination in step S600 corresponds to a state in which "the voltage drop amount is greater than or equal to the set drop amount". The expression of Ib=I−ΔI in step S650 corresponds to a state for "reducing the charging current value". Furthermore, in the present embodiment, the wires 57 and 58, the A/D converter circuit 60, and the sub-CPU 26 form a measurement unit for acquiring the voltage drop amount AV and the voltage drop rate Rv, which serve as measurement values.

It should be apparent to those skilled in the art that the present invention may be embodied in many other specific forms without departing from the spirit or scope of the invention. Particularly, it should be understood that the present invention may be embodied in the following forms.

[Modification 1]

Figure 8:
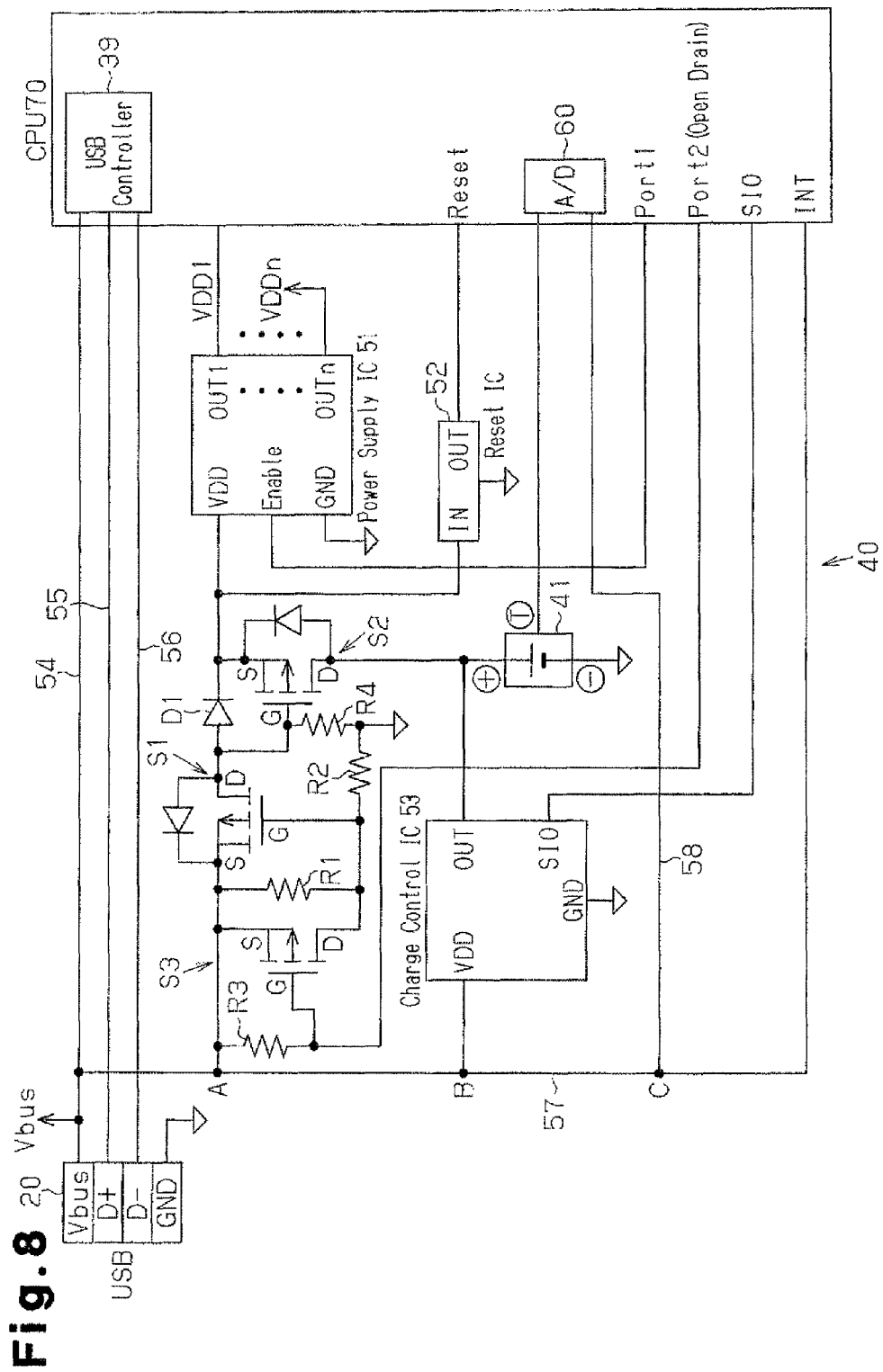
FIG. 8 is a block diagram showing the electrical configuration of a modified charger.

As shown in FIG. 8, a structure using only one CPU 70 may be employed. As shown in FIG. 8, the CPU 70 includes the USB controller 39, the A/D converter circuit 60, the Reset terminal, the Port 1 terminal, the Port 2 terminal, the SID terminal, the IN terminal, and the like. The CPU 70 implements the functions of both the main CPU 25 and the sub- CPU 26 of the first to third embodiments. The power supply voltage VDD1 (standby voltage) is supplied from the power supply circuit 40 to the CPU 70 in a power off state so that the CPU 70 performs the detection of a USB connector connection, the detection of a switch operation, the counting process of the timing counter, and the like. In a power on state, the power supply voltages VDD2 to VDDn are generated by the power supply IC 51 based on the enable signal from the Port 1 terminal and output to the corresponding power supplying destinations. The voltage (power supply voltage Vbus) at node C in the wire 57, which is capable of supplying the power supply voltage Vbus, is input to the A/D converter circuit 60 through the wire 58. The CPU 70 acquires the measurement voltage Vm. Thus, the CPU 70 performs the charging control process in accordance with the flowchart shown in FIG. 5 of the first embodiment or the flowchart shown in FIG. 6 of the second embodiment. Furthermore, the CPU 70 may calculate the voltage drop amount $\Delta V$ and the voltage drop rate Rv from the measurement voltage Vm and perform the charge control through the flowchart shown in FIG. 7 of the third embodiment. The power supply circuit 40 shown in FIG. 8 has a structure similar to that shown in FIG. 4. In this modification, the CPU 70 forms the detection unit, the measurement unit, the control unit, the power supply information acquiring unit, and the determination unit.

[Modification 2]

In each of the embodiments described above, when the measurement value of the charging current I enters an unstable range, the sub-CPU 26 sets Ib=I−$\Delta$I as the charging current value Ib for actual charging. The sub-CPU 26 may also further finely add $\Delta$i (<$\Delta$I) in the range of I−$\Delta$I≤Ib<I (I=I−$\Delta$I+$\Delta$i, . . . , I−$\Delta$I+m·$\Delta$i) and determines the maximum charging current that guarantees that the present measurement value obtained from the monitoring result of the measurement value is in a stable range. Further, the expressions of Ib=I−$\Delta$In (where $\Delta$In>$\Delta$I) may be used.

[Modification 3]

In the third embodiment, the sub-CPU 26 may activate the main CPU 25 when detecting a USB connection to perform USB communication with the other electronic device that serves as the connection origin and determine the charging current Ib based on the suppliable current (specified current) of that electronic device in the same manner as the second embodiment. That is, the processes of S230 to S290 shown in FIG. 6 may be added between S520 and S530 in FIG. 7.

[Modification 4]

In the third embodiment, only either one of the voltage drop amount $\Delta V$ and the voltage drop rate Rv may be used as the measurement value. Furthermore, when the voltage drop amount $\Delta V$ and the voltage drop rate Rv are both greater than or equal to their threshold values $\Delta$Vo and Rvo, it may be determined that the charging current is in the unstable range, and the charging current Ib(=I−$\Delta$I) preceding the present charging current I may be used for the actual charging.

[Modification 5]

The measurement voltage Vm in the first and the second embodiments may be further added as a measurement value in the third embodiment. For instance, when one of the measurement voltage Vm, the voltage drop amount $\Delta V$, and the voltage drop rate Rv is in the unstable side of the corresponding threshold value, the charging current that was in the stable range preceding the present charging current I may be used for the actual charging. When two or more of the three measurement values, which are the measurement voltage Vm, the voltage drop amount $\Delta V$, and the voltage drop rate Rv, is at the unstable side of the corresponding threshold value, the preceding charging current may be used for the actual charging.

Further, when all three of the measurement values are at the unstable side of the corresponding threshold values, the preceding charging current may be used for the actual charging.

[Modification 6]

The communication cable is not limited to a USB cable. For instance, an IEEE 1394 cable may be used.

[Modification 7]

The electronic device including the charger of the present invention is not limited to the electronic still camera (digital still camera), and may be an electronic device such as a mobile phone, a PDA, a portable game machine, and the like.

The present examples and embodiments are to be considered as illustrative and not restrictive, and the invention is not to be limited to the details given herein, but may be modified within the scope and equivalence of the appended claims.

Aspects of the present invention that can be understood from the disclosure of this specification will now be discussed.

[First Aspect]

A first aspect is a charger for an electronic device that charges a rechargeable battery arranged in the electronic device. The charger includes a detection unit which detects connection of another electronic device to the electronic device through a communication cable including a power supply line. A charging unit charges the rechargeable battery with power supply voltage from the power supply line of the communication cable. A measurement unit acquires a measurement value indicating a degree of a voltage drop of the power supply voltage occurred when the charging unit performs charging. A control unit instructs a charging current value for charging the rechargeable battery with the charging unit. When the detection unit detects connection of the other electronic device, the control unit monitors the measurement value obtained by the measurement unit while instructing the charging unit to increase the charging current value from an initial current value and determines the charging current value based on the monitored measurement value.

In the first aspect, when the detection unit detects connection of another electronic device, the control unit monitors the measurement value of the measurement unit, while instructing the charging unit to increase the charging current value from the initial current value, and determines the charging current value based on the monitoring result of the measurement value. Further, the control unit instructs the charging unit to charge the rechargeable battery with the determined charging current value. Therefore, the charging unit stably charges the rechargeable battery with the charging current value determined from the monitoring result even when the control unit cannot acquire the necessary charging information, such as the specified current, from the other electronic device that serves as the connection origin.

[Second Aspect]

In the charger according to the first aspect, when the monitored measurement value enters an unstable range in which the charging of the charging unit is not guaranteed, the control unit preferably determines the charging current value to be in a range in which the measurement value does not enter the unstable range and instructs the charging unit to charge the rechargeable battery with the determined charging current value.

[Third Aspect]

In the charger according to the first or second aspect, the measurement unit preferably acquires a dropped power supply voltage resulting from the charging as the measurement value. When the measurement value obtained by the measurement unit is less than the threshold value, the control unit preferably determines the charging current value so that the measurement value becomes greater than or equal to a threshold value.

[Fourth Aspect]

In the charger according to any one of the first to third aspects, the measurement unit preferably acquires a voltage drop amount, which is a difference between an initial power supply voltage when the detection unit detects connection of the other electronic device and a power supply voltage during charging, as the measurement value. The control unit preferably decreases the charging current value when the voltage drop amount becomes greater than or equal to a set drop amount.

[Fifth Aspect]

In the charger according to any one of the first to fourth aspects, when the control unit increases the charging current value from a previous value $I_{n-1}$ to a present value $I_n$, the measurement unit preferably calculates, based on a previous power supply voltage $V_{n-1}$ and a present power supply voltage $V_n$, a voltage drop rate $(V_{n-1}-V_n)/(I_{n-1}-I_n)$ as the measurement value. When the voltage drop rate exceeds a set threshold value, the control unit preferably determines the charging current value so that the voltage drop rate does not exceed the set threshold value.

[Sixth Aspect]

The charger according to any one the first to fifth aspects, further comprising a power supply information acquiring unit which acquires specified power supply information of the other electronic device by communicating with the other electronic device through the communication cable. A determination unit determines that the other electronic device is an AC adapter when the power supply information acquiring unit cannot perform communication with the other electronic device.

[Seventh Aspect]

In the charger according to the sixth aspect, the control unit preferably determines the charging current value in accordance with specified current value information contained in the specified power supply information when the power supply information acquiring unit performs communication with the other electronic device.

[Eighth Aspect]

In the charger according to any one of the first to seventh aspects, the measurement unit preferably measures the power supply voltage when the detection unit detects connection of the other electronic device. When the measured power supply voltage is outside a specified voltage range that the communication cable is capable of supplying and greater than or equal to a full charge voltage of the rechargeable battery, the control unit preferably determines that the other electronic device is a standard known AC adapter and instructs the charging unit for a charging current value corresponding to known specified power supply information of the standard known AC adapter.

[Ninth Aspect]

An electronic device including the charger according to any one of the first to the eighth aspects.

[Tenth Aspect]

A method for charging a rechargeable battery arranged in an electronic device. The method includes detecting, by the electronic device, connection of another electronic device to the electronic device through a communication cable including a power supply line; starting, by the electronic device, charging of the rechargeable battery using a power supply voltage from the power supply line of the communication cable; acquiring, by the electronic device, a measurement value indicating a degree of a voltage drop of the power supply voltage occurred during charging; and determining, by the electronic device, a charging current value of the rechargeable battery based on the measurement value. The determining step includes monitoring the measurement value during the charging while increasing the charging current value from an initial current value, and updating the charging current value based on the monitored measurement value. The method of the tenth aspect has the same advantages as the first embodiment.

What is claimed is:

1. A charger for an electronic device that charges a rechargeable battery arranged in the electronic device, the charger comprising:

a detection, unit which detects connection of another electronic device to the electronic device through a communication cable including a power supply line;

a charging unit which charges the rechargeable battery with power supply voltage from the power supply line of the communication cable;

a measurement unit which acquires a measurement value indicating a degree of a voltage drop of the power supply voltage occurred when the charging unit performs charging; and a control unit which instructs a charging current value for charging the rechargeable battery with the charging unit;

wherein when the detection unit detects connection of the other electronic device, the control unit monitors the measurement value obtained by the measurement unit while instructing the charging unit to increase the charging current value from an initial current value and determines the charging current value based on the monitored measurement value, and wherein when the monitored measurement value enters an unstable range in which the charging of the charging unit is not guaranteed, the control unit determines the charging current value to be in a range in which the measurement value does not enter the unstable range and instructs the charging unit to charge the rechargeable battery with the determined charging current value.

2. A charger for an electronic device that charges a rechargeable battery arranged in the electronic device, the charger comprising:

a detection unit which detects connection of another electronic device to the electronic device through a communication cable including a power supply line;

a charging unit which charges the rechargeable battery with power supply voltage from the power supply line of the communication cable;

a measurement unit which acquires a measurement value indicating a degree of a voltage drop of the power supply voltage occurred when the charging unit performs charging; and a control unit which instructs a charging current value for charging the rechargeable battery with the charging unit:

wherein when the detection unit detects connection of the other electronic device, the control unit monitors the measurement value obtained by the measurement unit while instructing the charging unit to increase the charging current value from an initial current value and determines the charging current value based on the monitored measurement value, wherein the measurement unit acquires a dropped power supply voltage resulting from the charging as the measurement value; and when the measurement value obtained by the measurement unit is less than the threshold value, the control unit determines the charging current value so that the measurement value becomes greater than or equal to a threshold value.

3. A charger for an electronic device that charges a rechargeable battery arranged in the electronic device, the charger comprising:
a detection unit which detects connection of another electronic device to the electronic device through a communication cable including a power supply line;
a charging unit which charges the rechargeable battery with power supply voltage from the power supply line of the communication cable;
a measurement unit which acquires a measurement value indicating a degree of a voltage drop of the power supply voltage occurred when the charging unit performs charging; and
a control unit which instructs a charging current value for charging the rechargeable battery with the charging unit;
wherein when the detection unit detects connection of the other electronic device, the control unit monitors the measurement value obtained by the measurement unit while instructing the charging unit to increase the charging current value from an initial current value and determines the charging current value based on the monitored measurement value,
wherein the measurement unit acquires a voltage drop amount as the measurement value, the voltage drop amount being a difference between an initial power supply voltage when the detection unit detects connection of the other electronic device and a power supply voltage during charging; and
the control unit decreases the charging current value when the voltage drop amount becomes greater than or equal to a set drop amount.

4. A charger for an electronic device that charges a rechargeable battery arranged in the electronic device, the charger comprising:
a detection unit which detects connection of another electronic device to the electronic device through a communication cable including a power supply line;
a charging unit which charges the rechargeable battery with power supply voltage from the power supply line of the communication cable;
a measurement unit which acquires a measurement value indicating a degree of a voltage drop of the power supply voltage occurred when the charging unit performs charging; and
a control unit which instructs a charging current value for charging the rechargeable battery with the charging unit;
wherein when the detection unit detects connection of the other electronic device, the control unit monitors the measurement value obtained by the measurement unit while instructing the charging unit to increase the charging current value from an initial current value and determines the charging current value based on the monitored measurement value, and
wherein when the control unit increases the charging current value from a previous value $I_{n-1}$ to a present value $I_n$, the measurement unit calculates, based on a previous power supply voltage $V_{n-1}$ and a present power supply voltage $V_n$, a voltage drop rate $(V_{n-1}-V_n)/(I_{n-1}-I_n)$ as the measurement value; and
when the voltage drop rate exceeds a set threshold value, the control unit determines the charging current value so that the voltage drop rate does not exceed the set threshold value.

5. A charger for an electronic device that charges a rechargeable battery arranged in the electronic device, the charger comprising:
a detection unit which detects connection of another electronic device to the electronic device through a communication cable including a power supply line;
a charging unit which charges the rechargeable battery with power supply voltage from the power supply line of the communication cable;
a measurement unit which acquires a measurement value indicating a degree of a voltage drop of the power supply voltage occurred when the charging unit performs charging:
a control unit which instructs a charging current value for charging the rechargeable battery with the charging unit;
wherein when the detection unit detects connection of the other electronic device, the control unit monitors the measurement value obtained by the measurement unit while instructing the charging unit to increase the charging current value from an initial current value and determines the charging current value based on the monitored measurement value,
a power supply information acquiring unit which acquires specified power supply information of the other electronic device by communicating with the other electronic device through the communication cable; and
a determination unit which determines that the other electronic device is an AC adapter when the power supply information acquiring unit cannot perform communication with the other electronic device.

6. The charger according to claim 5, wherein the control unit determines the charging current value in accordance with specified current value information contained in the specified power supply information when the power supply information acquiring unit performs communication with the other electronic device.

7. A charger for an electronic device that charges a rechargeable battery arranged in the electronic device, the charger comprising:
a detection unit which detects connection of another electronic device to the electronic device through a communication cable including a power supply line;
a charging unit which charges the rechargeable battery with power supply voltage from the power supply line of the communication cable;
a measurement unit which acquires a measurement value indicating a degree of a voltage drop of the power supply voltage occurred when the charging unit performs charging; and
a control unit which instructs a charging current value for charging the rechargeable battery with the charging unit;
wherein when the detection unit detects connection of the other electronic device, the control unit monitors the measurement value obtained by the measurement unit while instructing the charging unit to increase the charging current value from an initial current value and determines the charging current value based on the monitored measurement value,
the measurement unit measures the power supply voltage when the detection unit detects connection of the other electronic device; and
when the measured power supply voltage is outside a specified voltage range that the communication cable is capable of supplying and greater than or equal to a full charge voltage of the rechargeable battery, the control unit determines that the other electronic device is a standard known AC adapter and instructs the charging unit for a charging current value corresponding to known specified power supply information of the standard known AC adapter.

8. A charger for an electronic device that charges a rechargeable battery arranged in the electronic device, the charger comprising:
a detection unit which detects connection of another electronic device to the electronic device through a communication cable including a power supply line;
a charging unit which charges the rechargeable battery with power supply voltage from the power supply line of the communication cable;
a measurement unit which acquires a measurement value indicating a degree of a voltage drop of the power supply voltage occurred when the charging unit performs charging; and
a control unit which instructs a charging current value for charging the rechargeable battery with the charging unit;
wherein when the detection unit detects connection of the other electronic device, the control unit monitors the measurement value obtained by the measurement unit while instructing the charging unit to increase the charging current value from an initial current value and determines the charging current value based on the monitored measurement value, and
wherein the control unit continuously changes the charging current value as long as the monitored measurement value guarantee the charging, and performs test charging of the rechargeable battery with the changed charging current value.

9. The charger according to claim 8, wherein when the monitored measurement value does not guarantee the charging operation, the control unit performs actual charging of the rechargeable battery with the charging current value preceding the charging current value changed last during the test charging.

10. The charger according to claim 8, wherein when the changed charging current value exceeds a maximum current value that the communication cable is capable of supplying, the control unit performs actual charging of the rechargeable battery with the charging current value preceding the charging current value changed last during the test charging.

11. The charger according to claim 9, wherein the control unit determines, based on a measurement value acquired first by the measurement unit, whether the other electronic device has a known specified current value, and determines whether to perform the test charging based on the determination result.

12. The charger according to claim 2, wherein the control unit increases the charging current value in predetermined increments, and acquires the measurement value from the measurement unit whenever charging the rechargeable battery with the newly increased charging current value.

13. A charger for an electronic device that charges a rechargeable battery arranged in the electronic device, the charger comprising:
a detection unit which detects connection of another electronic device to the electronic device through a communication cable including a power supply line;
a charging unit which charges the rechargeable battery with power supply voltage from the power supply line of the communication cable;
a measurement unit which acquires a measurement value indicating a degree of a voltage drop of the power supply voltage occurred when the charging unit performs charging; and
a control unit which instructs a charging current value for charging the rechargeable battery with the charging unit;
wherein when the detection unit detects connection of the other electronic device, the control unit monitors the measurement value obtained by the measurement unit while instructing the charging unit to increase the charging current value from an initial current value and determines the charging current value based on the monitored measurement value, and
wherein the electronic device includes:
a main CPU which performs communication with the other electronic device through the communication cable; and
a sub-CPU connected to the power supply line of the communication cable and to the charging unit and the main CPU, wherein the sub-CPU functions as the detection unit, the measurement unit, and the control unit.

14. A method for charging a rechargeable battery arranged in an electronic device, the method comprising:
detecting, by the electronic device, connection of another electronic device to the electronic device through a communication cable including a power supply line;
starting, by the electronic device, charging of the rechargeable battery using a power supply voltage from the power supply line of the communication cable;
acquiring, by the electronic device, a measurement value indicating a degree of a voltage drop of the power supply voltage occurred during charging; and
determining, by the electronic device, a charging current value of the rechargeable battery based on the measurement value;
wherein the determining includes:
monitoring the measurement value during the charging while increasing the charging current value from an initial current value; and
updating the charging current value based on the monitored measurement value,
wherein the updating the charging current value includes:
comparing the monitored measurement value with a threshold value;
increasing the charging current value when the monitored measurement value is greater than or equal to the threshold value; and
decreasing the charging current value when the monitored measurement value is less than the threshold value.

15. The method according to claim 14, wherein the comparing includes:
acquiring the measurement value whenever the rechargeable battery is charged with the newly increased charging current value; and
comparing the newly acquired measurement value with the threshold value.

16. The method according to claim 14, wherein the updating the charging current value includes returning the newly increased charging current value to a preceding charging current value when the newly increased charging current value exceeds a maximum current value that the communication cable is capable of supplying.

17. A method for charging a rechargeable battery arranged in an electronic device, the method comprising:
detecting, by the electronic device, connection of another electronic device to the electronic device through a communication cable including a power supply line;
starting, by the electronic device, charging of the rechargeable battery using a power supply voltage from the power supply line of the communication cable;
acquiring, by the electronic device, a measurement value indicating a degree of a voltage drop of the power supply voltage occurred during charging; and determining, by the electronic device, a charging current value of the rechargeable battery based on the measurement value;

wherein the determining includes:
- monitoring the measurement value during the charging while increasing the charging current value from an initial current value; and
- updating the charging current value based on the monitored measurement value, determining whether the other electronic device is a device having a known specified current value based on the measurement value that is first acquired;

setting the charging current value in accordance with a known specified current value when the other electronic device is a device having the known specified current value; and setting the charging current value to the initial current value when the other electronic device is not a device having the known specified current value.

* * * * *